United States Patent [19]

Slater

[11] Patent Number: 4,493,189

[45] Date of Patent: Jan. 15, 1985

[54] DIFFERENTIAL FLOW HYDRAULIC TRANSMISSION

[76] Inventor: Harry F. Slater, 3491 Dover St., Napa, Calif. 94558

[21] Appl. No.: 327,409

[22] Filed: Dec. 4, 1981

[51] Int. Cl.³ ............................................. F16D 39/00
[52] U.S. Cl. ........................................ 60/489; 60/490; 60/491; 60/492; 92/12.2; 417/222; 91/504
[58] Field of Search .................... 60/489, 490, 491, 492; 92/12.2; 417/218, 222; 91/504, 505, 506

[56] References Cited

U.S. PATENT DOCUMENTS

| | | | |
|---|---|---|---|
| 1,840,868 | 1/1932 | Rayburn | 60/489 |
| 2,192,539 | 3/1940 | Condon | 60/492 |
| 2,770,099 | 11/1956 | Badalini | 60/492 |
| 2,874,533 | 2/1959 | Schott | 60/489 |
| 3,204,411 | 9/1965 | Stockton | 60/492 |
| 3,442,180 | 5/1969 | Olderaan | 60/490 |
| 3,504,492 | 4/1970 | Neukirch | 60/492 |
| 3,601,981 | 8/1971 | Ifield | 60/492 |
| 3,740,954 | 6/1973 | Young | 60/489 |

FOREIGN PATENT DOCUMENTS 1057189 8/1964 United Kingdom ............. 60/492

Primary Examiner—Sheldon J. Richter
Assistant Examiner—Randolph A. Smith
Attorney, Agent, or Firm—Christie, Parker & Hale

[57] ABSTRACT

An axial piston-type transmission in which a group of axially displaced pump pistons, that move in a cylinder block rotated by an input shaft, slidably engage one surface of a swash plate that rotates an output shaft. A group of axially displaced motor pistons, that move in a stationary cylinder block, slidably engage an opposite surface of the swash plate so that the plate is squeezed between the two groups of pistons. The swash plate is pivotally attached to the output shaft so that the angles between the two surfaces and the axis of rotation of the swash plate can be adjusted. The pump pistons and motor pistons are hydraulically connected in pairs. A rotary valve driven by the output shaft connects half the pump cylinders together hydraulically to form an output port and the other half together to form an input port. Relative rotation between the swash plate and the pump cylinder block causes the rotary valve to continuously switch each pump cylinder in sequence from the input port to the output port and from the output port back to the input port.

12 Claims, 3 Drawing Figures

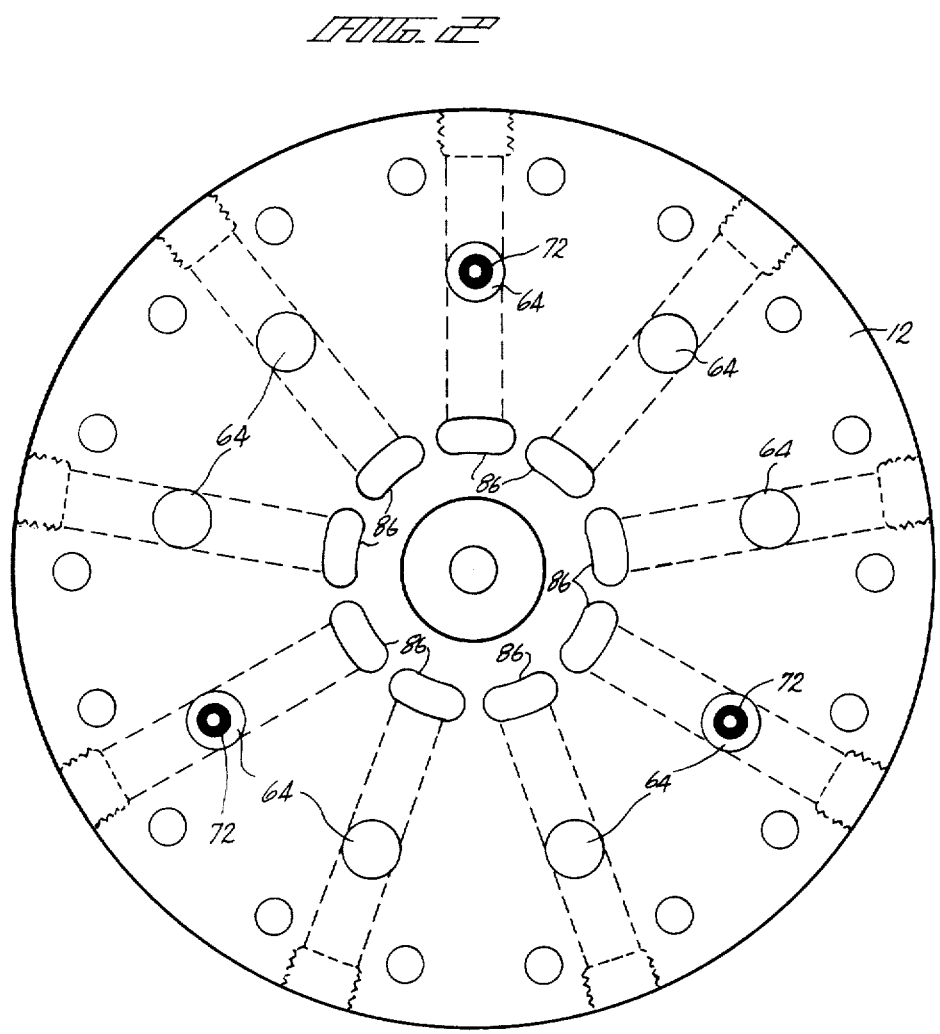

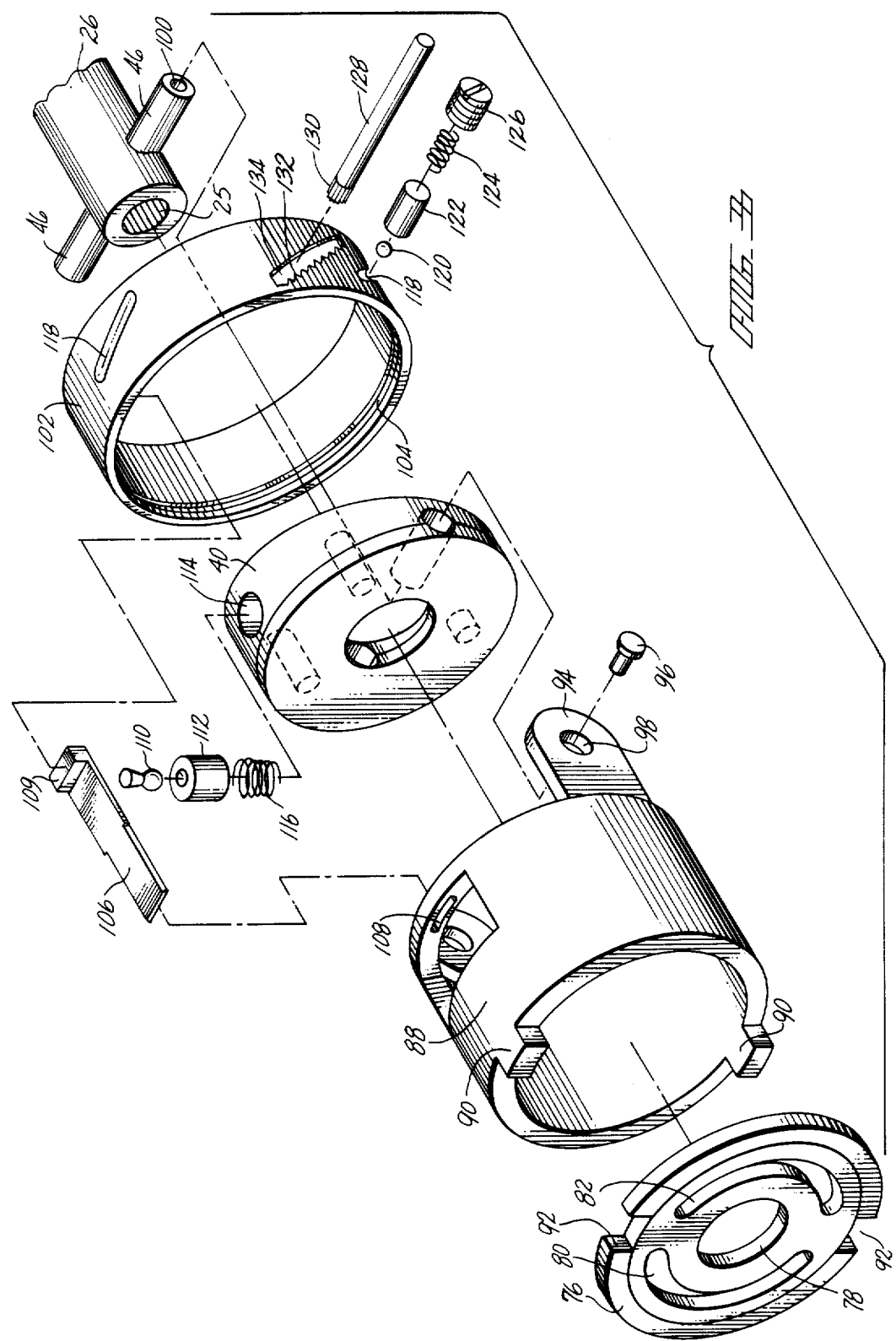

4,493,189

DIFFERENTIAL FLOW HYDRAULIC TRANSMISSION

FIELD OF THE INVENTION

This invention relates to hydraulic transmissions, and more particularly, to an axial piston differential flow type transmission.

BACKGROUND OF THE INVENTION

Axial piston type transmissions comprising an axial piston system operating as a pump and a second axial piston system acting as a motor are well known. The axial pistons of the pump move in a cylinder block that is rotated by an input shaft. The axial pistons engage the surface of a swash plate that is inclined with respect to the axis of rotation of the cylinder block, causing the pistons to reciprocate in the cylinders as the block rotates relative to the swash plate. The reciprocating pistons pump fluid through a rotary valve which divides the cylinders into two groups, the valve forming a high pressure output port for one group and a low pressure input port to the other group. The angle of the swash plate surface controls the stroke of the pistons. The motor pistons engage a second swash plate. The ratio of input and output speed is equal to the ratio of the stroke volumes of the motor and pump and is varied by varying the inclination of the swash plates. In some transmission systems the swash plates rotate with the drive shaft, and part of the power is transmitted mechanically and part of the power is transmitted through the hydraulic fluid. For example, if the swash plate associated with the motor is perpendicular to the axis of rotation of the drive shaft, no hydraulic fluid is pumped and the drive shaft and the output shaft are rigidly coupled together with all the power being transmitted by mechanical coupling with a 1:1 speed ratio, or direct drive. A transmission system of this type is described, for example, in U.S. Pat. No. 3,504,492.

One problem with such systems in which power is partially transmitted mechanically through the swash plates is that large thrust loads are encountered on the swash plates. As a result, the mounting for the swash plates requires very sturdy mechanical parts and bearings. Also a large force may be required to shift the angle of the swash plates.

SUMMARY OF THE INVENTION

The present invention is directed to an improved hydraulic transmission of the type in which part of the power is transmitted mechanically. The present invention has a number of advantages over the prior art. More specifically, the present invention provides a transmission having a differential flow characteristic but which utilizes a single swash plate for both the rotor and the pump. The single swash plate is positioned between the pump pistons and the motor pistons so that the swash plate is under compression between the pump and motor. No net axial load is applied to the swash plate, eliminating the need for any heavy thrust bearings in transmitting power through the transmission system. Also, there is no net load on the swash plate resisting the change of angle. Since there are no net axial forces or net shifting forces, a much lighter weight and compact transmission for a given peak horse power rating is achieved. The present invention provides a transmission having fewer components and the components that are present are better integrated into the overall design.

This is achieved, in brief, by providing a transmission in which a pump rotor is secured to an input shaft that is journaled in the housing of the transmission. The rotor has a plurality of pump cylinders radially spaced around the axis of rotation of the shaft, the cylinders extending parallel to the axis of rotation. A coaxially aligned output shaft, journaled to the input shaft by a bearing, has a motor rotor in the form of a wedge-shaped disc pivotally secured thereto, the motor rotor pivoting about a diameter intersecting the axis of rotation of the output shaft and functioning as a swash plate. The housing provides a plurality of motor cylinders on the opposite side of the swash plate from the pump cylinders, the pump and motor cylinders being axially aligned with each other and parallel to the axis of rotation of the shafts. Pump pistons and motor pistons in the respective cylinders slidably engage opposing surfaces of the swash plate. The other ends of the cylinders are hydraulically connected through a rotary valve which is driven in synchronism with the output shaft. The rotary valve connects the piston cylinders into a high pressure group and a low pressure group. An external control mechanism allows the swash plate to be tilted relative to the axis of rotation of the drive shafts to vary the speed and torque of the output shaft relative to the input shaft.

BRIEF DESCRIPTION OF THE DRAWINGS

For a more complete understanding of the invention, reference should be made to the accompanying drawings, wherein:

FIG. 2 is a sectional view taken substantially on the line 2—2 of FIG. 1; and

FIG. 3 is an exploded isometric view of the swash plate assembly.

DETAILED DESCRIPTION

Figure 1:
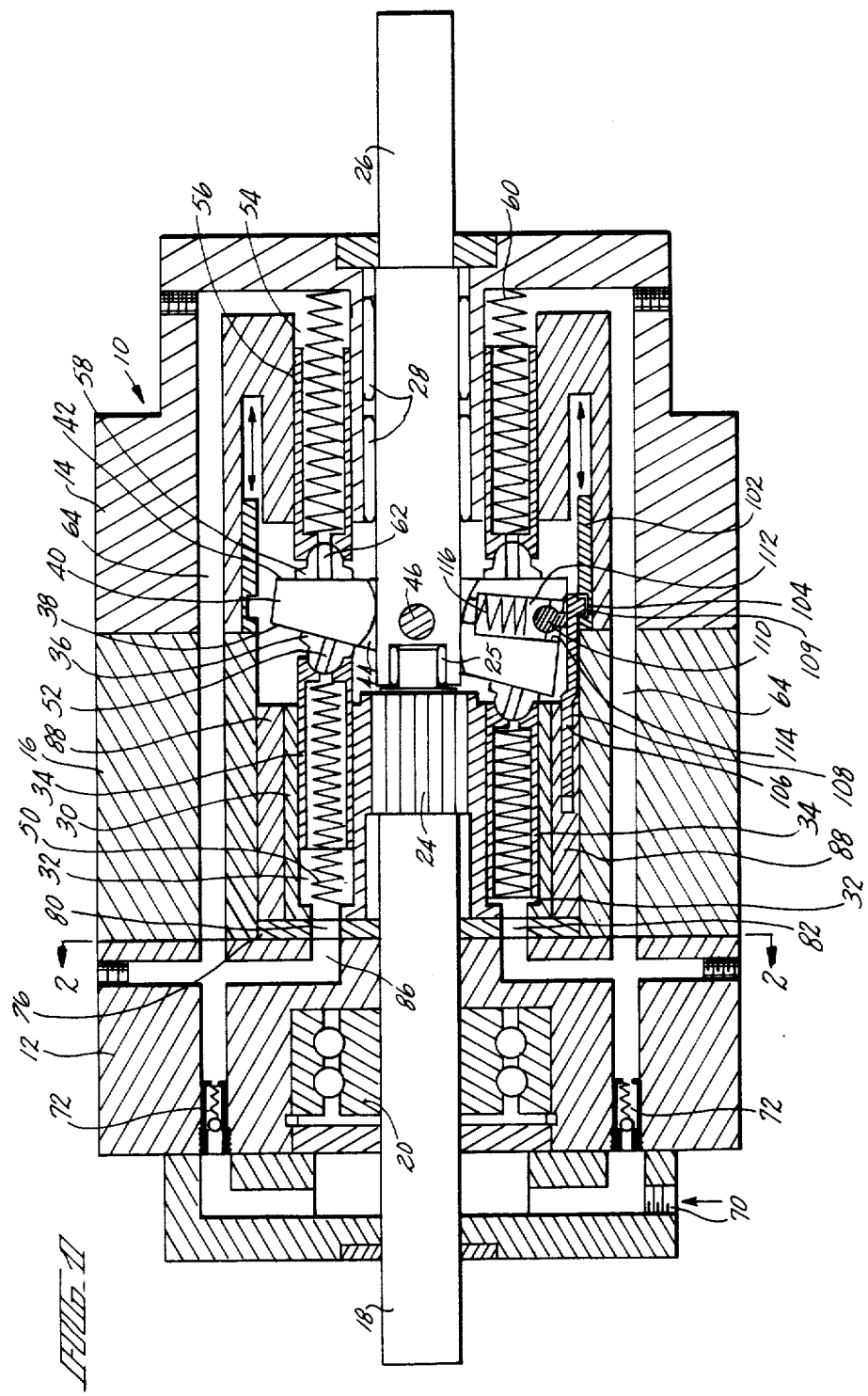
FIG. 1 is a cross-sectional view of the transmission of the present invention.

Referring to the drawings in detail, the numeral 10 indicates generally the housing of the transmission which is preferably constructed in three sections, a pump end plate 12, a motor stator end plate 14 and a pump casing 16. The three sections are bolted or otherwise assembled into a single housing. An input drive shaft 18 is journaled in the pump end plate 12 by a suitable bearing, such as the double row ball bearing indicated at 20. The inner end of the input shaft 18 extends into the interior of the pump casing 16 and is formed with a splined end 24.

An output drive shaft 26 is journaled in the motor stator end plate 14 of the housing by needle bearings 28. The output shaft 26 is coaxially aligned with the input shaft 18. The end of the input shaft 18 telescopes into the end of the output shaft 26 and is journaled in a needle bearing 25.

The pump assembly includes a pump rotor 30 which is attached to the splined end 24 of the input drive shaft 18 and is rotated within the casing 16 by the input shaft. The pump rotor 30 forms a pump cylinder block for nine hydraullic cylinders 32 which extend in an axial direction and are spaced at equal intervals and at a constant radial distance about the axis of rotation of the shaft. Each cylinder 32 has a piston 34 which moves longitudinally in the associated cylinder. One end of each piston forms a ball-and-socket joint with a hydraulic shoe 36 that slidably engages a flat surface 38 of a motor rotor or swash plate 40.

The swash plate 40 is in the form of a wedge-shaped disc formed by opposing flat surfaces 38 and 42 which lie in intersecting planes. These planes typically intersect at an acute angle of 15°. The swash plate 40 has a central opening 44 which receives the inner end of the output shaft 26. The swash plate or motor rotor 40 hinged to the output shaft by trunnions 46 integral to the output shaft and journaled at either end in sleeve bearings in the swash plate, allowing the rotor to be pivoted or tilted relative to the axis of rotation of the output shaft 26. For ease of assembly, the swash plate may be constructed in two halves which are bolted or otherwise secured together to form the swash plate. The axis of the trunnions 46 intersects the axis of rotation of the output shaft 26 and extends along a diameter of the swash plate 40. The swash plate can be pivoted from outside the housing in a manner hereinafter described in detail to change the angle of the faces 38 and 42 relative to the axis of rotation of the shaft.

The hydraulic shoes 36 are maintained in sliding contact with the surface 38 by springs 50 inside the cylinders 32 which urge the pistons toward the swash plate. The ends of each piston at the ball-and-socket joint has a fluid passage that communicates with a fluid passage in the hydraulic shoe 36, as indicated at 52, thus directing hydraulic fluid into the space between the surface of the shoe and the surface 38 of the swash plate to form a low friction lubricating film between the sliding surfaces.

A similar group of nine motor cylinders 54 are provided in the motor end plate 14 which are axially aligned with the pump cylinders 32. Each motor cylinder has a motor piston 56 slidably positioned in the cylinder, the end of each piston 56 terminating in a ball-and-socket joint with a hydraulic shoe 58. The hydraulic shoes 58 are in sliding engagement with the surface 42 of the swash plate 40. Springs 60 urge the pistons 56 toward the swash plate to hold the hydraulic shoes in contact with the surface 42. A fluid passage 62 extending through the hydraulic shoes 58 allows hydraulic fluid to flow from the cylinders to lubricate the interface between the hydraulic shoes and the surface 42 of the swash plate.

The pump cylinders 32 and motor cylinders 54 are hydraulically connected by a series of passages 64. These passages and the ends of the hydraulic cylinders on one side of the respective pistons are filled with hydraulic fluid under pressure from a hydraulic inlet 70 through check valves 72 from a charging pump (not shown). The hydraulic passages 64 are interconnected to form two separate groups of passages by a rotary valve assembly including a kidney plate 76. As shown in FIG. 3, the kidney plate 76 has a central opening 78 which is journaled on the input drive shaft 18. Two arcuate slots 80 and 82 are aligned with the centers of the cylinders 32. The arcuate slots 80 and 82 thus provide two fluid passages for interconnecting respectively two separate groups of cylinders 32 with each other and with axially aligned passages 86 in the pump end plate. Each of the passages 86 is connected through an associated one of the passages 64 to a motor cylinder. The arcuate slots 80 and 82 act as inlet and outlet ports for the pump.

The kidney plate 76 is rotated in synchronism with the output shaft 26 by means of a coupler tube 88. The coupler tube is concentric with the pump rotor 30 on the inside and the pump casing 16 on the outside. The coupler tube 88 is coupled to the kidney plate 76 by a pair of lugs 90 which engage mating slots 92 at diametrically opposite positions on the periphery of the kidney plate 76. The coupler tube is joined to the shaft 26 by diametrically positioned integral flange portions 94 which overlap the outside of the swash plate 40. Bearing pins 96 journaled in openings 98 in the flange section 94 are press fitted into holes 100 in the ends of the trunnions 46, thus allowing the swash plate to pivot relative to the coupler tube 88 while causing the coupler tube, kidney plate, swash plate and shaft 26 to rotate as a unit.

The tilt angle between the swash plate 40 and the axis of the output shaft 26 is controlled by a shift collar 102. The inside of the cylindrical collar 102 is provided with a circumferential groove 104. This groove is engaged by one end of a shifting link 106 that is slidably supported for movement in an axial direction by a slot 108 in the coupler tube 88. The shifting link 106 has a shoe 109 that engages the groove 104 in the shifting collar 102. A ball pin 110 projects radially inwardly from the shifting link 106 and engages a socket member 112 that is slidably supported in a radially extending cylindrical opening 114 in the wide end of the wedge-shaped swash plate 40. A spring 116 urges the socket into engagement with the ball pin 110. Thus axial movement of the shift link 106 causes the swash plate 40 to tilt about the axis of trunnions 46 to change the angle between the faces 38 and 42 of the swash plate relative to the axis of the shaft 26. The shift collar 102 imparts axial displacement to the shift link 106 by means of a set of three equally spaced skewed slots 118 in the outer surface of the collar 102. Each slot is engaged by a spring loaded detent ball 120 pressed into the skewed slot by a detent assembly including a socketed pin 122, spring 124 and threaded plug 126 mounted in the housing opposite the positions of each of the skewed slots 118 and the collar 102. A rack and pinion shifting mechanism includes a shaft 128 journaled in motor stator end plate 14 and terminating in a pinion 130 that engages a gear rack 132 formed along one edge of a slot 134 in the collar 102. Thus rotation of the shaft 128 imparts rotation to the collar 102. Because of the skewed slots 118 and detent balls 120, rotation of the collar 102 causes axial movement of the collar 102. This in turn causes the shift link 106 to shift axially, thereby changing the tilt angle of the swash plate 40.

The swash plate 40 is caused to tilt between the position shown in FIG. 1 in which the face plate 42 is perpendicular to the axis of rotation of the shaft 26, through an angle of approximately 15°, in which the face 38 of the swash plate 40 is positioned perpendicular to the axis of rotation of the shaft 26. This causes the speed of the output shaft 26 to vary from zero to a maximum angular velocity in which the input shaft and output shaft rotate at the same speed. The transmission operates as a constant horsepower, variable speed, variable torque device. With the swash plate in either perpendicular position, no fluid is pumped between the pump cylinders and the motor cylinders. Thus with the face 42 perpendicular to the axis of rotation, as shown in FIG. 1, there is no reciprocating action of the motor pistons 56 and therefore there can be no reciprocating movement of the pump pistons 34. Therefore, there can be no relative angular movement between the swash plate 40 and the pump rotor 30. Hence the shaft 26 is locked mechanically to the input drive shaft 18 and they rotate as a unit.

If the swash plate 40 is tilted to the other perpendicular position in which the surface 38 is perpendicular to the axis of rotation, there is no reciprocating movement of the pistons 34 and therefore no reciprocating movement of the motor pistons 56. Hence the output shaft 26 is mechanically locked to the housing 10 and cannot rotate while the input drive shaft 18 rotates freely. If the swash plate is tilted beyond perpendicular on the side of face 38, resulting in the tilt on face 42 to be at the included angle of the swash plate plus the angle of tilt beyond perpendicular on face 38, reverse rotation of the output shaft to the input shaft results. With the swash plate in an intermediate position, for example, with the surfaces 38 and 42 at an angle of $\pm 7\frac{1}{2}°$ from the perpendicular to the axis of rotation, maximum reciprocal movement of the pump and motor pistons is produced and a speed ratio of 2:1 between the input shaft and the output shaft is provided. The ratio of input speed for forward operation is given by the following equation:

$$N_i/N_o = (V_o/V_i) + 1 \quad (1)$$

and the torque ratio for forward operation is given by the equation:

$$T_o/T_i = (V_o/V_i) + 1 \quad (2)$$

These equations show that when the volumetric displacement per revolution on the input and output is equal, the speed ratio between the input and output shaft is 2:1 with a torque multiplication between the output shaft and the input shaft being 2:1.

The ratio of input speed in reverse operation is given by the following equation:

$$N_i/N_o = (V_o/V_i) - 1 \quad (3)$$

and the torque ratio for reverse operation is given by the equation:

$$T_o/T_i = (V_o/V_i) - 1 \quad (4)$$

These equations show that if equal volumetric displacements per revolution on the input and output were possible, (the limited tilt beyond perpendicular on face 38 and the included angle of the swash plate prevent this possibility):

$$(V_o/V_i) - 1 \text{ would equal } 0. \quad (5)$$

Thus:

$$N_i/N_o = 0 \text{ and } T_o/T_i = 0. \quad (6)$$

Therefore, the maximum speed ratio in reverse will always be that $N_i$ is larger than $N_o$ and $V_o$ will always be larger than $V_i$. These favorable restraints are secured by the amount of tilt allowed to the swash plate in reverse operation and the included angle of the swash plate.

From the above description, it will be seen that one of the significant features of applicant's design is that the swash plate is pressed between the pump pistons and the motor pistons but the net axial force on the swash plate is zero, and the net force resisting tilting of the swash plate is substantially zero since the axial forces on either side of the swash plate balance out. The trunnions 46 are therefore required only to transmit torque loads and do not have to absorb any significant axial loads. The aligned arrangement of the pump cylinders and the motor cylinders gives rise to a very compact design. The transmission is capable of operating at very high pressures, e.g., 10,000 psi, and since the output torque is directly proportional to the hydraulic pressure of the transmission, the transmission is capable of transmitting relatively high torques for its size. It should be noted that any leakage of hydraulic fluid, such as results from the lubrication of the hydraulic shoes, is returned to a sump from the housing and recirculated into the hydraulic system of the transmission by the charging pump. The concentric coupler tube arrangement for controlling the rotary valve from the output shaft 26 also serves as a bearing support for the shifting link, a centering positioner for the swash plate 40 and also as a dynamic counter balance for the dynamically unbalanced swash plate.

What is claimed is:

1. A hydraulic transmission comprising:
a fixed housing, an input shaft and output shaft journaled in the housing in coaxial alignment, a pump rotor in the housing secured to the input shaft, the rotor having a plurality of pump cylinders radially spaced around the axis of rotation of said shafts, the cylinders extending parallel to said axis of rotation, a pump piston in each pump cylinder movable in a direction parallel to said axis of rotation, the fixed housing having a plurality of stationary motor cylinders radially spaced around and extending parallel to said axis of rotation, a motor piston in each motor cylinder, a motor rotor pivotally connected to and rotating with the output shaft about the same axis of rotation as the output shaft and positioned axially between the pump cylinders and the motor cylinders, the motor rotor pivoting about a single axis extending perpendicular to said axis of rotation of the output shaft, the motor rotor having a pair of flat surfaces lying in respective planes extending at an acute angle to each other and parallel to said single pivot axis, means connected to each pump piston and motor piston slidably engaging the adjacent one of said flat surfaces, hydraulic means including a rotary valve member for fluid connecting a first group of pump cylinders to a first group of motor cylinders and a second group of pump cylinders to a second group of motor cylinders, rotation of the rotary valve switching the pump cylinders and motor cylinders successively from one of said groups to the other, and means rotatably coupling the rotary valve means to the output shaft, said means rotating the rotary valve means and the output shaft together as a unit.

2. Apparatus of claim 1 further including means for tilting the motor rotor relative to the output shaft about said pivot axis.

3. Apparatus of claim 2 wherein the tilting means tilts the motor rotor between two positions in which one or the other of said flat surfaces is perpendicular to the axis of rotation of the shafts.

4. Apparatus of claim 1 further including spring means for urging each of said pump and motor pistons toward the motor rotor.

5. Apparatus of claim 1 wherein said rotary valve means comprises a disc having a pair of arcuate slots extending through the disc, the disc rotating about said axis of rotation of the shafts adjacent one end of the pump cylinders, the arcuate slots in the disc being radially aligned with the axes of the pump cylinders, each slot forming a fluid path interconnecting a group of pump cylinders and a group of motor cylinders.

6. Apparatus of claim 5 further including a tube member concentric with the pump rotor, means connecting one end of the tube member to the disc, and means connecting the other end of the tube member to the motor rotor.

7. Apparatus of claim 6 wherein said means connecting the tube member to the motor rotor includes pivot means connecting the tube member to the motor rotor along said single pivot axis.

8. A hydraulic transmission comprising:

a housing, an input shaft and output shaft journaled in the housing for rotation about a common axis of rotation, a pump rotor secured to the input shaft, a motor rotor adjacent the pump rotor, hinge means connecting the motor rotor to the output shaft for providing rotation of the motor rotor and output shaft as a unit about said common axis while allowing the motor rotor to tilt about a hinge axis extending perpendicular to said common axis, the rotor having opposing flat surfaces extending at an acute angle to each other, said surfaces being positioned by said hinge means at a variable angle to said common axis, a plurality of pump cylinders in a pump rotor, a plurality of motor cylinders in the housing, the cylinders extending parallel to said common axis and being arcuately spaced around said common axis, the motor rotor being positioned between one of the ends of the pump cylinder and one of the ends of the motor cylinders, pump and motor piston means slidable in each of the pump and motor cylinders respectively, the pump piston means being in sliding engagement with one of said motor rotor surfaces and the motor piston means being in sliding engagement with the other of said motor rotor surfaces, a rotary valve member positioned between one end of the pump rotor and the housing and rotatable about said common axis, the housing having a fluid passage extending from each motor cylinder opening adjacent one side of the valve member and the pump rotor having a fluid passage from each pump cylinder opening adjacent the opposite side of the rotary valve member, the valve member having a pair of fluid passages, each valve member passage connecting a group of pump cylinder passages to each other and to a group of motor cylinder passages, and means coupling the valve member and the output shaft for rotating the valve member relative to the housing and the pump cylinder in synchronism with rotation of the output shaft, relative rotation between the valve member and the housing switching the motor cylinder passages successively from one group of pump cylinders to the other, and relative rotation between the valve member and the pump rotor switching the pump cylinder passages successively from one group of motor cylinders to the other.

9. Apparatus of claim 8 wherein the valve member is a flat disc journaled on the input shaft between one end of the pump rotor and the adjacent housing, the respective pump cylinder passages being axially aligned with the motor cylinder passages on either side of the disc, the disc having a pair of arcuate slots forming two ports, each slot providing a fluid connection between a separate group of pump passages and a separate group of motor passages.

10. Apparatus of claim 9 wherein said means rotating the valve member includes a tube coaxial with and surrounding the pump rotor, the tube being coupled at one end to the valve member and at the other end to the output shaft.

11. Apparatus of claim 10 further including trunnions integral to the output shaft, the trunnions extending transverse to the axis of revolution of the shaft, the trunnions engaging the tube for rotating the tube and shaft as a unit.

12. Apparatus of claim 11 wherein the motor rotor is pivotally supported on said trunnions.

* * * * *